US012352581B2

(12) United States Patent
Nachstedt et al.

(10) Patent No.: US 12,352,581 B2
(45) Date of Patent: Jul. 8, 2025

(54) METHOD FOR ASCERTAINING AN INITIAL POSE OF A VEHICLE

(71) Applicant: Robert Bosch GmbH, Stuttgart (DE)

(72) Inventors: Timo Nachstedt, Benningen (DE); Georg Krause, Ludwigsburg (DE); Renlin Li, Heilbronn (DE)

(73) Assignee: ROBERT BOSCH GMBH, Stuttgart (DE)

( * ) Notice: Subject to any disclaimer, the term of this patent is extended or adjusted under 35 U.S.C. 154(b) by 233 days.

(21) Appl. No.: 17/997,008

(22) PCT Filed: May 4, 2021

(86) PCT No.: PCT/EP2021/061645
§ 371 (c)(1),
(2) Date: Oct. 24, 2022

(87) PCT Pub. No.: WO2021/233674
PCT Pub. Date: Nov. 25, 2021

(65) Prior Publication Data
US 2023/0221125 A1    Jul. 13, 2023

(30) Foreign Application Priority Data

May 20, 2020   (DE) ...................... 10 2020 206 356.7

(51) Int. Cl.
*G01C 21/30* (2006.01)
(52) U.S. Cl.
CPC .................. *G01C 21/30* (2013.01)
(58) Field of Classification Search
CPC ...................................... G01C 21/30
See application file for complete search history.

(56) References Cited

U.S. PATENT DOCUMENTS 10,445,772 B1 *  10/2019  Chau ................. G06T 7/337
11,408,741 B2 *   8/2022  Miyake ............. G01C 21/30
(Continued)

FOREIGN PATENT DOCUMENTS

DE    102017108107 A1    10/2018
EP        3663718 A1     6/2020
(Continued)

OTHER PUBLICATIONS

International Search Report for PCT/EP2021/061645, Issued Aug. 16, 2021.

*Primary Examiner* — Kenny Nguyen
(74) *Attorney, Agent, or Firm* — NORTON ROSE FULBRIGHT US LLP

(57) ABSTRACT

A method for ascertaining an initial pose of a vehicle using a control device. Measured data ascertained by a GNSS sensor system and/or an odometry sensor system are received and evaluated to ascertain an approximate pose of the vehicle with a margin of uncertainty. At least one trajectory of road users is extracted from a trajectory map for the ascertained margin of uncertainty. Test points are positioned along the extracted trajectory. An optimization algorithm is performed for each test point along the trajectory. The optimization algorithm ascertains poses having corresponding cost functions. A pose having the greatest cost function is determined as the initial pose of the vehicle from the poses ascertained by the optimization algorithm. A control device, a computer program, and a machine-readable storage medium are also provided.

10 Claims, 2 Drawing Sheets

(56) References Cited

U.S. PATENT DOCUMENTS

| | | | |
|---|---|---|---|
| 11,562,501 B1* | 1/2023 | Liu | G06T 7/30 |
| 11,624,616 B1* | 4/2023 | Liu | G06V 20/588 |
| | | | 701/446 |
| 11,639,853 B2* | 5/2023 | Minamiguchi | B60W 30/18163 |
| | | | 701/445 |
| 2018/0143647 A1* | 5/2018 | Wang | G01S 7/4808 |
| 2018/0188027 A1* | 7/2018 | Zhang | G06V 20/588 |
| 2018/0216942 A1* | 8/2018 | Wang | G01S 17/89 |
| 2018/0307941 A1* | 10/2018 | Holz | G05D 1/0268 |
| 2019/0011927 A1* | 1/2019 | Mou | G06V 20/56 |
| 2020/0003563 A1* | 1/2020 | Miyake | B60W 30/18163 |
| 2020/0011693 A1* | 1/2020 | Yoo | B60W 60/001 |
| 2021/0224917 A1* | 7/2021 | Gaudin | B60W 50/14 |
| 2021/0300412 A1* | 9/2021 | Dingli | B60W 50/0098 |
| 2021/0370980 A1* | 12/2021 | Ramamoorthy | G06V 20/56 |
| 2023/0159056 A1* | 5/2023 | Cheng | B60W 50/0098 |
| | | | 701/301 |
| 2023/0202497 A1* | 6/2023 | Fu | B60W 10/20 |
| | | | 701/23 |
| 2023/0365154 A1* | 11/2023 | Beauvisage | G06V 20/588 |

FOREIGN PATENT DOCUMENTS

| | | |
|---|---|---|
| JP | 2015152346 A | 8/2015 |
| JP | 2017058235 A | 3/2017 |
| JP | 2019207177 A | 12/2019 |

* cited by examiner

METHOD FOR ASCERTAINING AN INITIAL POSE OF A VEHICLE

FIELD

The present invention relates to a method for ascertaining an initial pose of a vehicle. In addition, the present invention relates to a control device, a computer program and to a machine-readable memory medium.

BACKGROUND INFORMATION

The use of highly precise digital maps is of essential importance for implementing automated driving functions. Such maps may complement the sensor-based environment acquisition of a vehicle that is operable in an automated manner. Different digital maps, which include geographical road courses and typical trajectories of road users, for example, are already available. The typical trajectories can be extracted from so-called swarm trajectories of a multitude of vehicles.

To use the digital maps, the vehicle must be capable of accurately determining its own pose, which is made up of a position and an orientation of the vehicle. For instance, the pose of the vehicle can be ascertained by evaluating GNSS signals from corresponding satellites. However, a GNSS-based localization has insufficient availability and accuracy.

Iterative localization methods, which require a precise initial position or starting position, are normally used for determining the pose. To ascertain the initial position or starting pose, the approximate vehicle location can be ascertained and the pose then be refined with the aid of a feature-based localization using measured radar data, for instance. In the feature-based localization, statistical features are extracted from the measured radar data and compared with features stored in a feature map. Toward this end, a multidimensional hill-climbing algorithm, for instance, is used to obtain an optimal orientation of the features. Such an orientation of the features in multiple dimensions requires a high computing power, however.

SUMMARY

An object of the present invention includes providing a method for ascertaining an initial position of a vehicle which makes fewer demands on the computing power.

This object may achieved according to the present invention. Advantageous example embodiments of the present invention are disclosed herein.

According to one aspect of the present invention, a method is provided for ascertaining an initial pose or starting pose of a vehicle using a control device.

The present method may particularly be executed by an initialization module of the control device in the form of hardware and/or software.

According to an example embodiment of the present invention, in one step, measured data are received from a GNSS sensor system and/or an odometry sensor system and evaluated in order to ascertain an approximate pose of the vehicle with a margin of uncertainty.

For the ascertained margin of uncertainty, at least one trajectory of road users is extracted from a trajectory map. The at least one extracted trajectory, for instance, represents a common trajectory of road users from historical data.

In a further step, test points are positioned along the extracted trajectory, and an optimization algorithm is performed for each test point along the trajectory. The execution of the optimization algorithm makes it possible to perform a feature-based localization or a refinement of the approximate pose. Measured data from a radar sensor system, a LIDAR sensor system and/or a camera sensor system can be used for this purpose and be compared to data from a digital feature map. The optimization algorithm of each test point is able to be performed continuously along the trajectory or can be performed discretely for each specified test point.

Next, the optimization algorithm is used to ascertain poses having corresponding cost functions. The poses may represent local maxima of the cost function, for instance.

In a further step, a pose having the greatest cost function is ascertained as the initial pose of the vehicle from the poses ascertained by the optimization algorithm.

The present method is able to reduce the computing power required to ascertain the initial position insofar as the optimization algorithm can optimize the cost function through a reduced number of necessary function calls. More specifically, based on the information from the trajectory map, a two-dimensional optimization problem is reduced to a one-dimensional optimization problem along the typical extracted trajectories of the trajectory map.

According to an example embodiment of the present invention, the optimization algorithm serves the specific purpose of comparing statistical features extracted from measured data from an environment sensor system to features from a feature map and to determine a precise initial position of the vehicle in this way. For this purpose, measured data from an environment sensor system such as a radar sensor system, a LIDAR sensor system and/or a camera sensor system can be received and evaluated in advance in order to extract statistical features from a vehicle environment. Based on the received sections of trajectories from the trajectory map ascertained in the margin of uncertainty of the approximately determined pose, the statistical features can be compared with the features stored in the feature map in a linear or one-dimensional manner along the trajectories. This measure makes it possible to ascertain the initial pose more rapidly and at a lower computing power requirement.

According to a further aspect of the present invention, a control device is provided, the control device being designed to carry out the present method. For instance, the control device may be a vehicle-side control device, a vehicle-external control device, or a vehicle-external server unit such as a cloud system.

The restriction of the optimization problem to predefined trajectories is not limited to the ascertainment of the initial pose. As a matter of fact, the principle can also be used in other methods such as a lane-keeping assistant.

The control device may particularly include a localization module and/or an initialization module. This makes it possible for the control device to execute the method for ascertaining an initial pose of the vehicle and/or a method for performing a localization.

In addition, a computer program is provided according to one aspect of the present invention, which includes instructions that upon an execution of the computer program by a computer or a control device, induce it to carry out the method according to the present invention. According to another aspect of the present invention, a machine-readable memory medium is provided on which the computer program according to the present invention is stored.

The vehicle may be operated in an assisted, partially automated, highly automated and/or fully automated or a driverless manner according to the BASt standard.

For instance, the vehicle may be a passenger vehicle, a truck, a robo-taxi and the like. The vehicle is not restricted to an operation on roads. In point of fact, the vehicle may also be developed as a water vehicle, an airborne vehicle such as a transport drone, and the like.

In one embodiment of the present invention, an orientation of the vehicle is determined from the ascertained approximate pose of the vehicle and compared with driving directions of the extracted trajectories, and a filter function is implemented for the exclusive consideration of trajectories featuring driving directions, and trajectories that agree with the orientation of the vehicle are taken into account.

This measure makes it possible to remove all sections of trajectories in the margin of uncertainty that do not match a driving direction of the vehicle. As a consequence, the optimization algorithm can be further accelerated, for instance because a comparison of features along trajectories of oncoming traffic is avoided.

According to a further embodiment of the present invention, a hill-climbing algorithm is performed as an optimization algorithm. This makes it possible to carry out the comparison of the statistical features extracted from measured data of the environment sensor system with features from the feature map in a technically particularly simple and rapid manner. The cost function may preferably be at its maximum at the greatest agreement between the statistical features and features from the feature map, which means that finding at least one maximum of the cost function is a potential goal of the optimization algorithm.

According to a further exemplary embodiment of the present invention, the optimization algorithm is performed along the at least one extracted trajectory within the ascertained the margin of uncertainty. By restricting the trajectories to the margin of uncertainty of the ascertained pose, a length of the sections of the trajectories is able to be further reduced.

Because the length of the sections of the trajectories is restricted, it is possible to further reduce a search range or orientation range of the optimization algorithm and to accelerate the method.

According to a further embodiment of the present invention, the present method for ascertaining the initial pose of the vehicle is carried out repeatedly at defined time intervals. This measure makes it possible to ascertain the initial pose at regular time intervals and to utilize it for consistency checks or validations of a parallel localization function, for instance.

According to a further exemplary embodiment of the present invention, a plurality of initial poses of the vehicle is ascertained at different points in time, and a deviation of the vehicle from a traffic lane or a traffic lane change is determined by detecting inconsistencies between the ascertained initial poses. For example, if one of a plurality of ascertained poses deviates from the trajectory and/or from the older poses, then a lack of agreement or an inconsistency is able to be ascertained.

Given a determined inconsistency, a lane change of the vehicle may be considered as a trigger for the inconsistency. This measure enables a detection of lane changes or unintentional deviations from the traffic lane.

As an alternative or in addition, an inconsistency is able to be determined by a deviation of the ascertained pose from an extracted trajectory. A tolerance deviation, which must be exceeded in order to determine the inconsistency, may be provided in this context.

According to a further embodiment of the present invention, measured data from at least one LiDAR sensor and/or radar sensor are received and evaluated. Next, features are ascertained based on the measured data and compared with data from a feature map to determine a pose of the vehicle along the extracted trajectory in the feature map.

A maximum cost function of a pose of the vehicle based on a minimal deviation of the ascertained features and the features stored in the feature map is calculated with the aid of the optimization algorithm. In particular, one of multiple potential pose(s) featuring the highest or best cost function, and thus the best agreement between the features, is able to be selected.

This measure makes it possible to determine an approximate or rough range which is further refined by the feature-based localization. As a result, the initial pose is able to be implemented more rapidly and using fewer computing operations because the range utilized for the feature-based localization is restricted by the margin of uncertainty of the approximately ascertained pose of the vehicle.

In the following text, the present invention will be described in greater detail with the aid of greatly simplified schematic representations.

DETAILED DESCRIPTION OF EXAMPLE EMBODIMENTS

Figure 1:
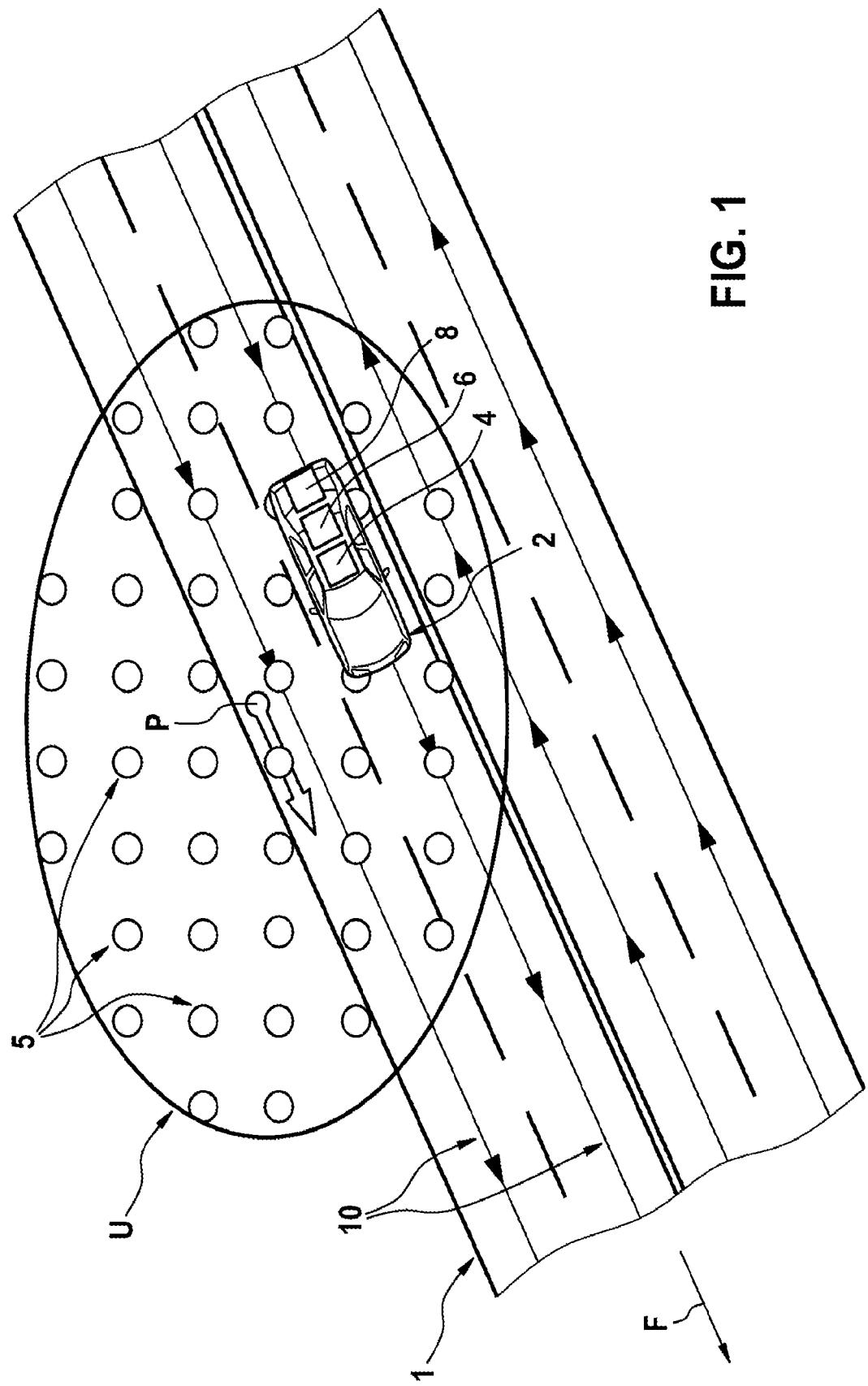
FIG. 1 shows a schematic representation of a traffic lane with a margin of uncertainty of an approximate pose and a multitude of points for performing an optimization algorithm, according to an example embodiment of the present invention.
Figure 2:
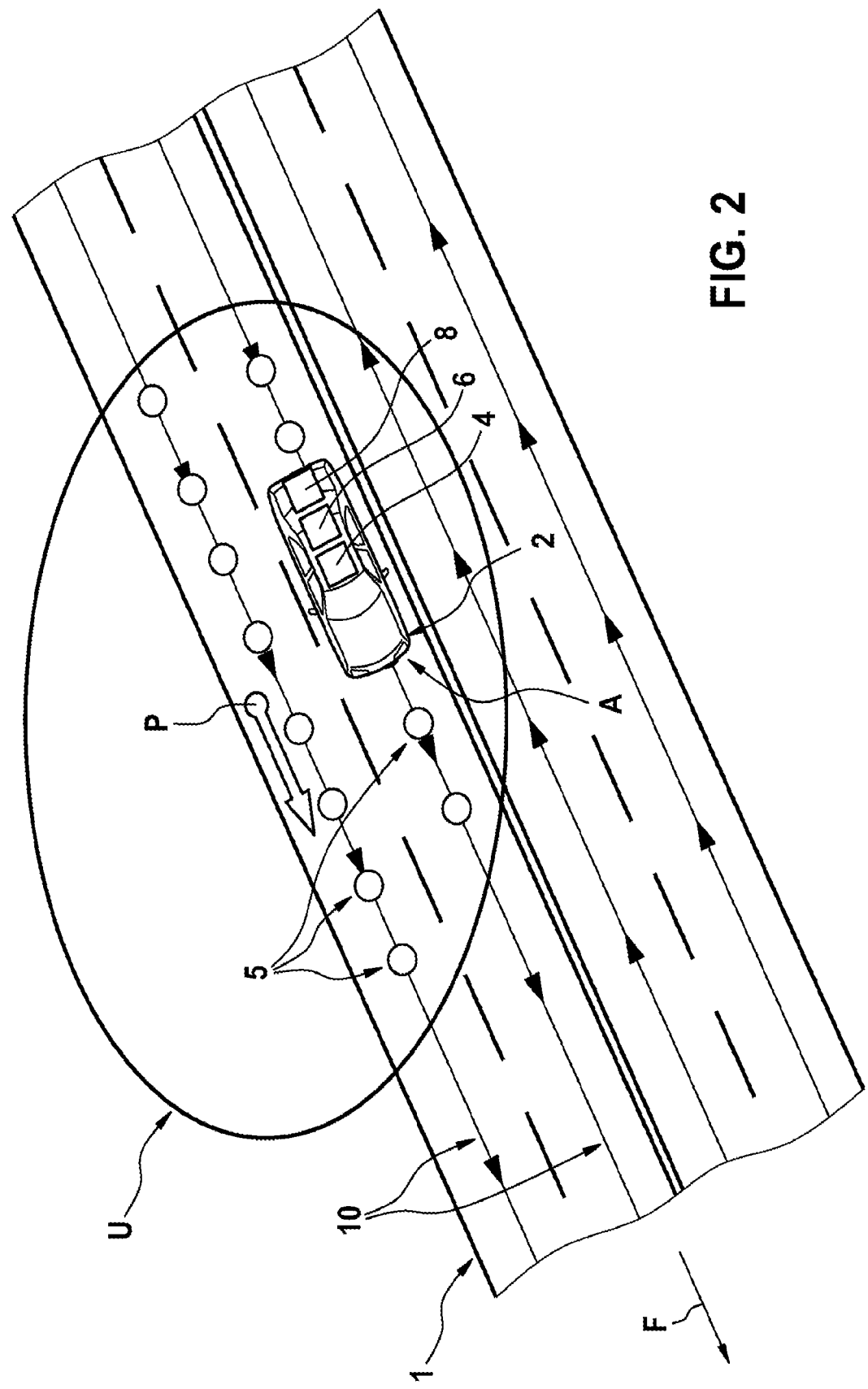
FIG. 2 shows a schematic representation of a traffic lane with a margin of uncertainty of a pose and a multitude of points for performing an optimization algorithm along trajectories, according to an example embodiment of the present invention.

FIGS. 1 and 2 show schematic representations to illustrate a method for ascertaining an initial pose A of a vehicle 2, which is able to be used in a localization of vehicle 2 (not described further). For instance, initial pose A may be determined with the aid of a vehicle-side control device 4 which carries out the method.

FIG. 1 shows a schematic representation of a traffic lane 1 with a margin of uncertainty U of an approximate pose P and a plurality of test points 5 for performing an optimization algorithm. Vehicle 2 travels in traffic lane 1 in driving direction F.

Vehicle 2 has an odometry sensor system and/or a GNSS sensor system 6 and an additional sensor system 8 for a feature-based localization. Additional sensor system 8 may be developed as a LiDAR sensor system, a radar sensor system and/or a camera sensor system, for instance.

In the illustrated exemplary embodiment, the odometry sensor system and GNSS sensor system 6 collect measured data while the vehicle is in motion. An approximate pose P is determined from the measured data of the odometry sensor system and GNSS sensor system 6. Since approximate pose P includes errors, a margin of uncertainty U of approximate pose U is schematically illustrated.

Test points 5 may be distributed across entire margin of uncertainty U. Starting from the positions of test points 5, an optimization algorithm is able to be performed. However, in order to accelerate the optimization algorithm, trajectories 10 that run through margin of uncertainty U are extracted from a trajectory map.

Next, test points 5 are positioned along extracted trajectories 10 so that the optimization algorithm is performed for each test point 5 and along trajectories 10. This makes it possible to reduce the calculation work of the optimization algorithm from a two-dimensional to a one-dimensional problem. This step is shown in FIG. 2.

FIG. 2 shows a schematic representation of traffic lane 1 including a margin of uncertainty U of a pose, and a multitude of test points 5 for carrying out the optimization algorithm along trajectories 10.

Based on the historical data of the trajectory map, the probability for vehicle 2 along one of extracted trajectories 10 is the most likely. As a result, the optimization algorithm is performed along extracted trajectories 10.

When the optimization algorithm is performed, measured data preferably received from environment sensor system 8 are received and evaluated.

Statistical features are ascertained based on the measured data and compared to data of a feature map. The optimization algorithm is predominantly used for adapting the statistical features to features of the feature map and for maximizing a cost function.

The cost function reaches its maximum when the extracted statistical features optimally agree with the features of the feature map.

One of multiple possible poses of vehicle 2 that has a maximum cost function is ascertained as an initial pose A and used for a further localization of vehicle 2.

What is claimed is:

1. A vehicle positioning method for a vehicle using a control device, the method comprising the following steps:
   receiving and evaluating measured data ascertained by a GNSS sensor system and/or an odometry sensor system to ascertain an approximate pose of the vehicle;
   based on the ascertained approximate pose, using a trajectory map to identify one or more historical statistically significant prior trajectories of one or more vehicles that are within a predefined margin of uncertainty drawn about a position of the ascertained approximate pose;
   based on the identification of the one or more historical statistically significant prior trajectories, positioning test points along the identified one or more historical statistically significant prior trajectories;
   performing an optimization that selectively applies an optimization algorithm to only the test points positioned along the identified one or more historical statistically significant prior trajectories, so that the optimization algorithm is not applied to data pertaining to only other positions around the approximate pose that do not coincide with any of the one or more historical statistically significant prior trajectories, wherein the optimization algorithm ascertains poses having corresponding cost functions; and
   selecting, as an optimized initial pose of the vehicle, one of the poses ascertained by the optimization algorithm which has a greatest cost function of all of the poses ascertained by the optimization algorithm.

2. The method as recited in claim 1, wherein a hill-climbing algorithm is performed as the optimization algorithm.

3. The method as recited in claim 1, wherein the optimization algorithm is performed along respective entireties of each of the identified one or more historically statistically significant prior trajectories.

4. The method as recited in claim 1, wherein the vehicle positioning method is carried out repeatedly at defined time intervals.

5. The method as recited in claim 4, wherein a plurality of initial poses of the vehicle is ascertained at different points in time, and a deviation of the vehicle from a traffic lane or a traffic lane change is determined by detecting inconsistencies between the ascertained initial poses.

6. The method as recited in claim 1, wherein measured data ascertained by at least one LiDAR sensor and/or radar sensor are received and evaluated, and the optimization algorithm includes:
   ascertaining features based on the measured data;
   comparing the ascertained features with data of a feature map in order to determine prospective poses of the vehicle; and
   calculating a maximum cost function of each of the prospective poses of the vehicle based on a minimum deviation of the ascertained features and features stored in the feature map.

7. The method as recited in claim 1, wherein the identification is based on driving directions of a plurality of trajectories of the trajectory map, such that trajectories of the trajectory map whose respective driving directions do not agree with the approximate pose are not included in the identified one or more historical statistically significant prior trajectories.

8. A control device comprising:
   a processor, wherein the processor is programmed, for performing vehicle positioning for a vehicle to:
   receive and evaluate measured data ascertained by a GNSS sensor system and/or an odometry sensor system to ascertain an approximate pose of the vehicle;
   based on the ascertained approximate pose, use a trajectory map to identify one or more historical statistically significant prior trajectories of one or more vehicles that are within a predefined margin of uncertainty drawn about a position of the ascertained approximate pose;
   based on the identification of the one or more historical statistically significant prior trajectories, position test points along the identified one or more historical statistically significant prior trajectories;
   perform an optimization that selectively applies an optimization algorithm to only the test points positioned along the identified one or more historical statistically significant prior trajectories, so that the optimization algorithm is not applied to data pertaining to only other positions around the approximate pose that do not coincide with any of the one or more historical statistically significant prior trajectories, wherein the optimization algorithm ascertains poses having corresponding cost functions; and
   select, as an optimized initial pose of the vehicle, one of the poses ascertained by the optimization algorithm which has a greatest cost function of all of the poses ascertained by the optimization algorithm.

9. A non-transitory machine-readable memory medium on which is stored a computer program that is executable by a computer, and that, when executed by the computer, causes the computer to perform a vehicle positioning method, the method including the following steps:
   receiving and evaluating measured data ascertained by a GNSS sensor system and/or an odometry sensor system to ascertain an approximate pose of the vehicle;
   based on the ascertained approximate pose, using a trajectory map to identify one or more historical statistically significant prior trajectories of one or more vehicles that are within a predefined margin of uncertainty drawn about a position of the ascertained approximate pose;

based on the identification of the one or more historical statistically significant prior trajectories, positioning test points along the identified one or more historical statistically significant prior trajectories;

performing an optimization that selectively applies an optimization algorithm to only the test points positioned along the identified one or more historical statistically significant prior trajectories, so that the optimization algorithm is not applied to data pertaining to only other positions around the approximate pose that do not coincide with any of the one or more historical statistically significant prior trajectories, wherein the optimization algorithm ascertains poses having corresponding cost functions; and selecting, as an optimized initial pose of the vehicle, one of the poses ascertained by the optimization algorithm which has a greatest cost function of all of the poses ascertained by the optimization algorithm.

10. A vehicle positioning method for a vehicle using a control device, the method comprising:

receiving and evaluating measured data ascertained by a GNSS sensor system and/or an odometry sensor system to ascertain an approximate pose of the vehicle with a margin of uncertainty;

extracting at least one trajectory of road users from a trajectory map for the ascertained margin of uncertainty;

determining an orientation of the vehicle from the ascertained approximate pose of the vehicle;

comparing the determined orientation with driving directions of the extracted at least one trajectory;

based on a result of the comparison, implementing a filter function to select from the extracted at least one trajectory only one or more of the at least one trajectory that each has a respective driving direction that agrees with the determined orientation of the vehicle;

based on the selection, positioning test points selectively along the selected one or more of the at least one trajectory;

performing an optimization algorithm for the test points positioned along the selected one or more of the at least one trajectory, the optimization algorithm ascertaining poses having corresponding cost functions; and ascertaining, as an initial pose of the vehicle, a pose having a greatest cost function from the poses ascertained by the optimization algorithm.

* * * * *